United States Patent [19]

Friedrich

[11] Patent Number: 4,768,797

[45] Date of Patent: Sep. 6, 1988

[54] FOLDING WHEELCHAIR HAVING ADJUSTABLE WHEELS AND ARMRESTS

[75] Inventor: Paul H. Friedrich, Camarillo, Calif.

[73] Assignee: Everest & Jennings, Camarillo, Calif.

[21] Appl. No.: 7,929

[22] Filed: Jan. 28, 1987

[51] Int. Cl.[4] ............................................. B62M 1/14

[52] U.S. Cl. .............................. 280/242 WC; 280/42; 280/289 WC; 280/661; 297/416; 297/188; 403/4

[58] Field of Search ......... 280/42, 242 WC, 289 WC, 280/650, 661, 657; 297/417, 416, 188, 429; 403/3, 4, 388, 408.1

[56] References Cited

U.S. PATENT DOCUMENTS

| | | | |
|---|---|---|---|
| 2,561,616 | 7/1951 | Everest et al. | 280/242 WC |
| 2,669,289 | 2/1954 | Usher et al. | 280/42 |
| 4,311,338 | 1/1982 | Moorhouse | 297/417 |
| 4,553,785 | 11/1985 | Duke, Jr. et al. | 297/188 |
| 4,570,756 | 2/1986 | Minnebraker et al. | 280/242 WC |
| 4,577,903 | 3/1986 | Wells | 297/188 |
| 4,592,570 | 6/1986 | Nassiri | 280/650 |
| 4,595,212 | 6/1986 | Haury et al. | 280/242 WC |

FOREIGN PATENT DOCUMENTS

| | | | |
|---|---|---|---|
| 455094 | 1/1928 | Fed. Rep. of Germany | 280/661 |
| 3517050 | 11/1986 | Fed. Rep. of Germany | 280/242 WC |

*Primary Examiner*—David M. Mitchell
*Assistant Examiner*—Brian L. Johnson
*Attorney, Agent, or Firm*—Kelly, Bauersfeld & Lowry

[57] ABSTRACT

A lightweight folding wheelchair is provided with relatively wide range adjustment capability and/or adaptation to meet the specific needs of an individual wheelchair user. The folding wheelchair includes left and right tubular frame sections which are connected by pivoting cross braces to permit rapid movement between folded and unfolded positions. The frame sections include a respective pair of camber plates carrying wheel bushings for quick release attachment of relatively large rear wheels for the wheelchair, wherein the camber plates are adapted for mounting in one of several different orientations on their respective frame sections to select the specific wheel camber angle. The folding wheelchair further includes improved armrests adapted for rapid and facilitated positional adjustment with minimum dexterity requirement. Fabric side panels for the wheelchair are provided for easy installation without the use of tools and conveniently include accessible pockets for storage of selected items. Wheel lock units are also provided for engaging the large rear wheels to prevent chair movement wherein these wheel lock units can be mounted in alternative positions as desired by the wheelchair user.

21 Claims, 6 Drawing Sheets

FIG. 1
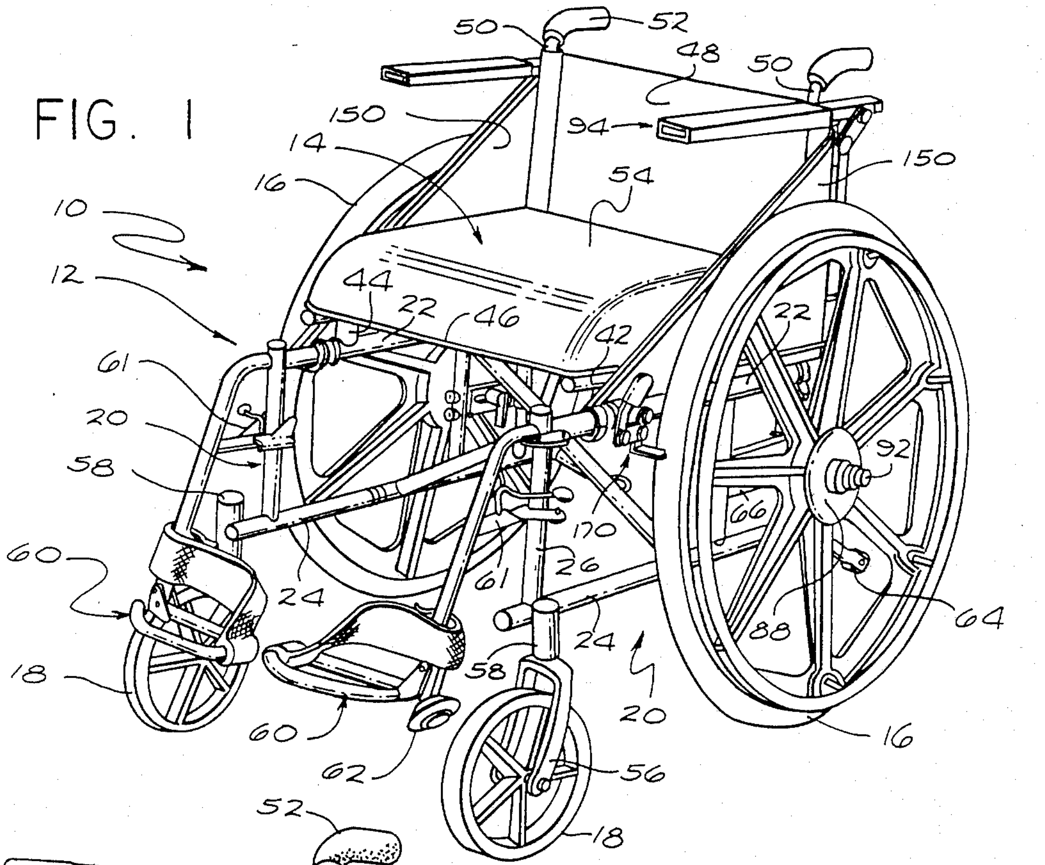
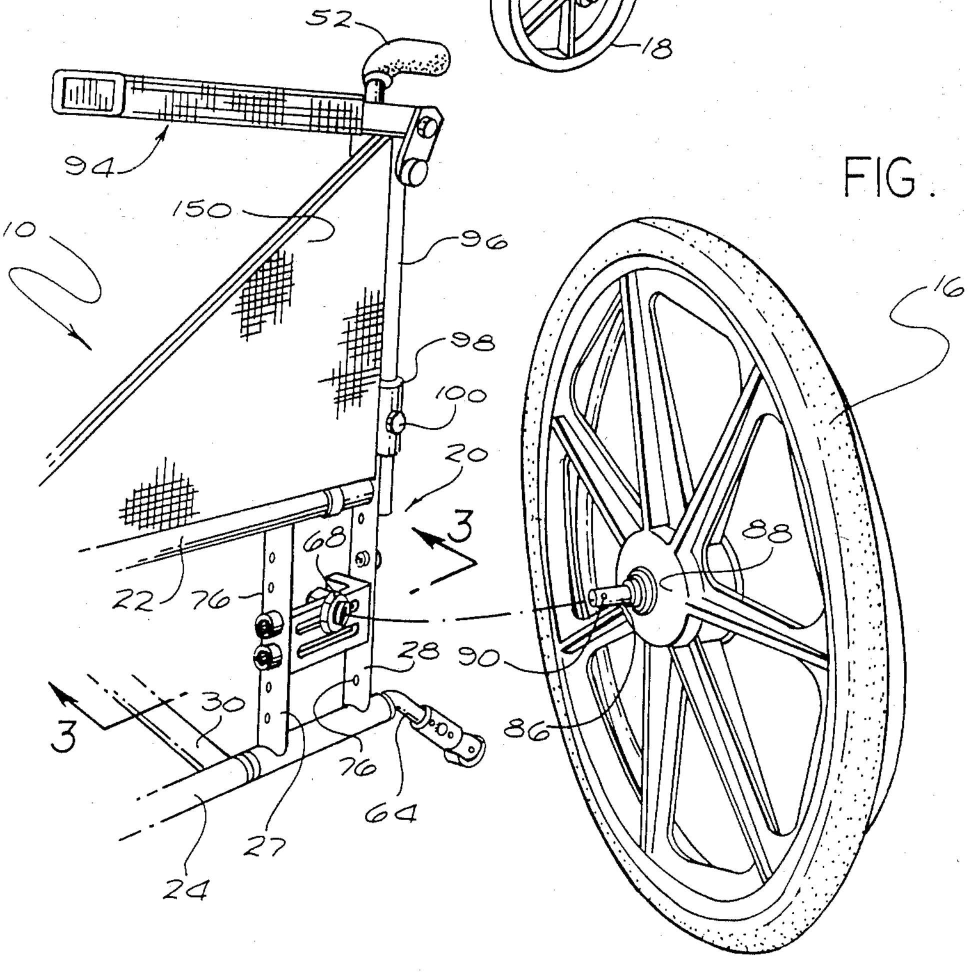
FIG. 2

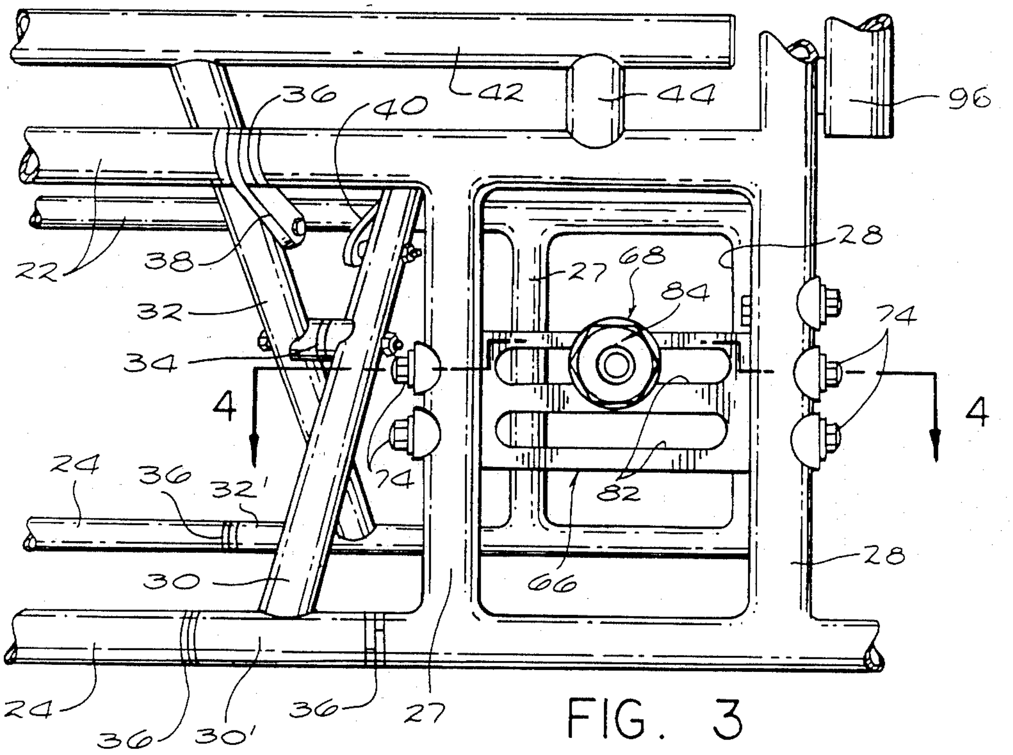
FIG. 3
FIG. 4
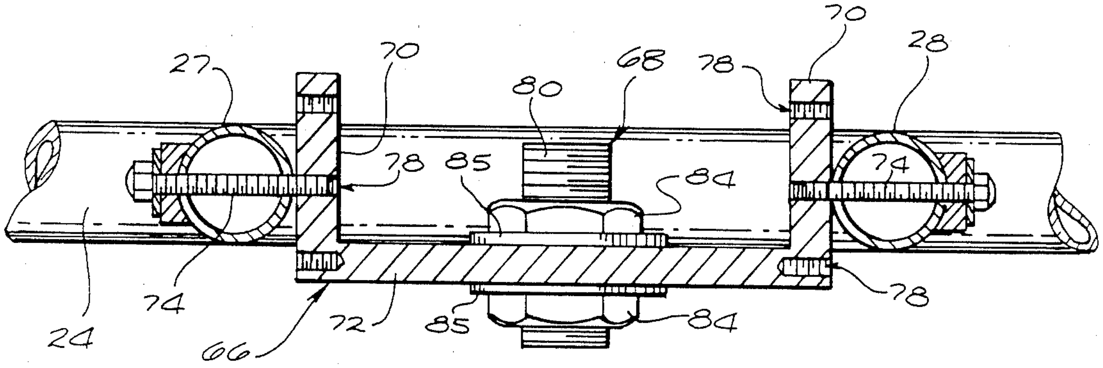
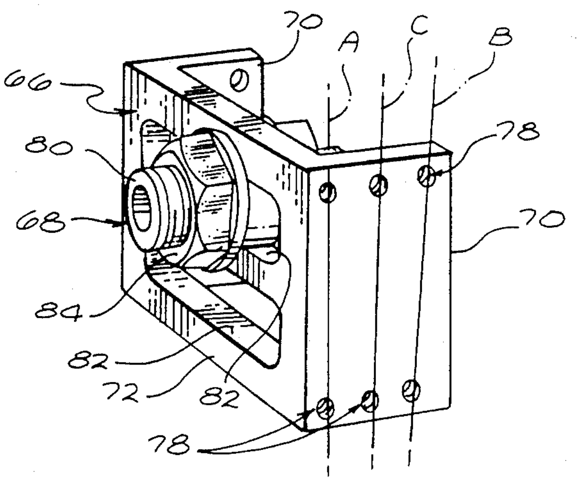
FIG. 5

FIG. 6
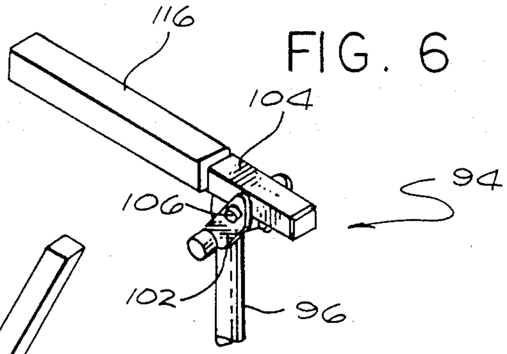
FIG. 7
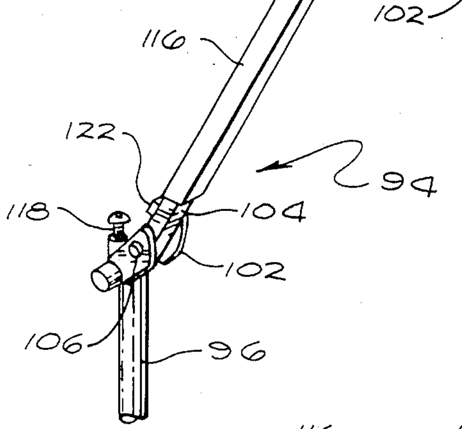
FIG. 8
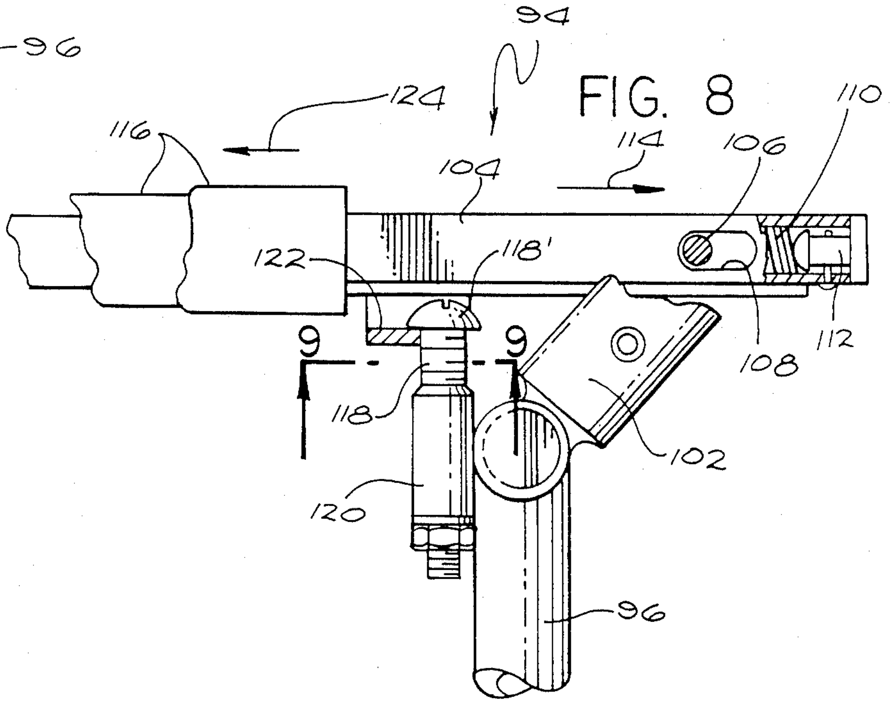
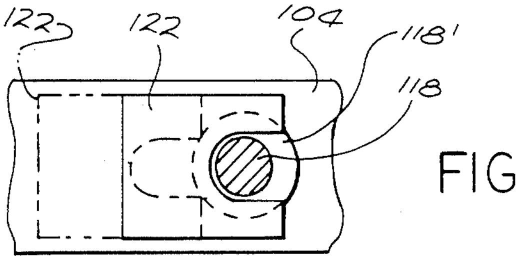
FIG. 9

FIG. 12
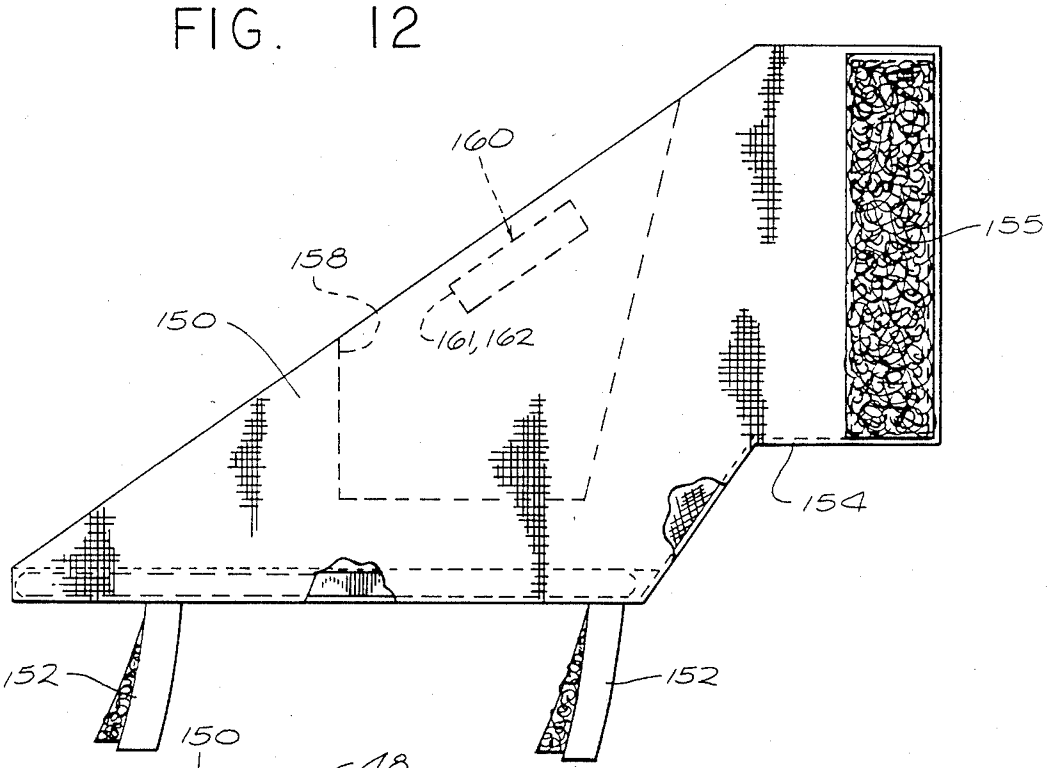
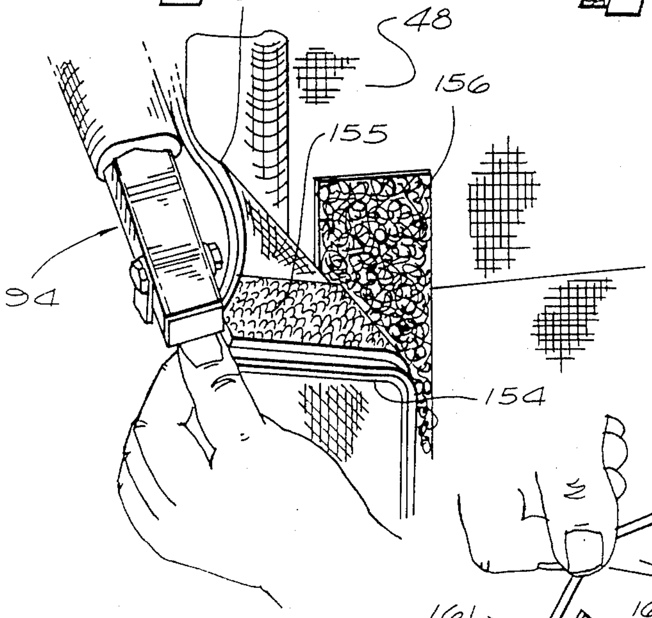
FIG. 13
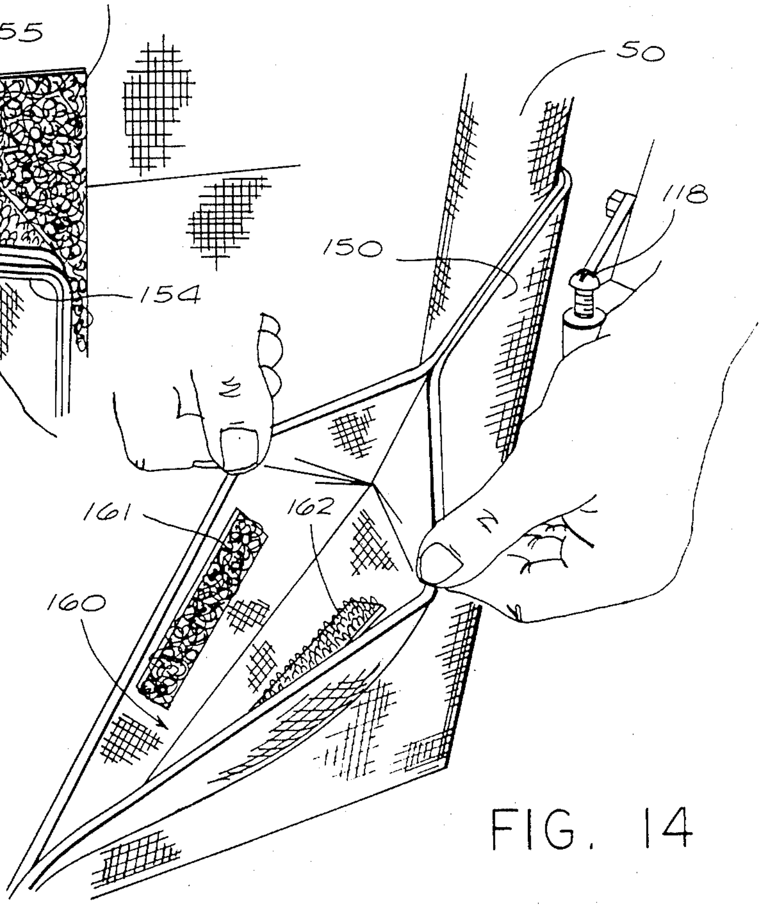
FIG. 14

FIG. 15
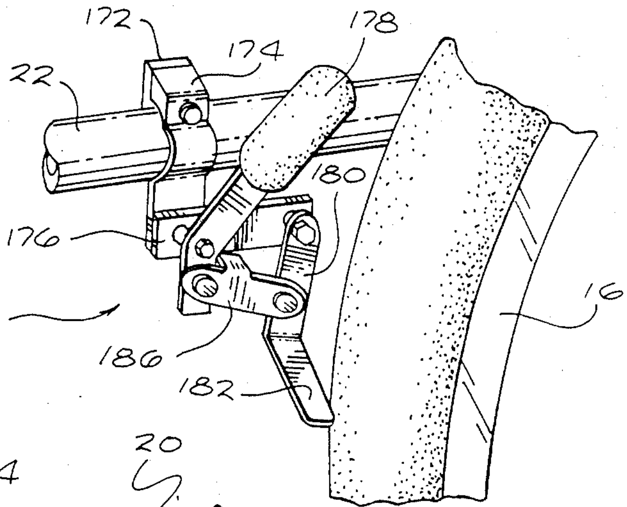
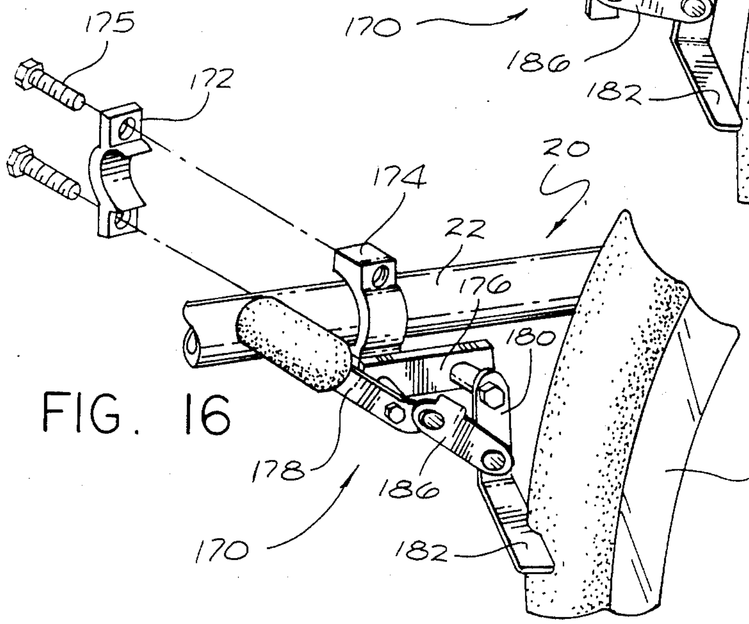
FIG. 16
FIG. 17
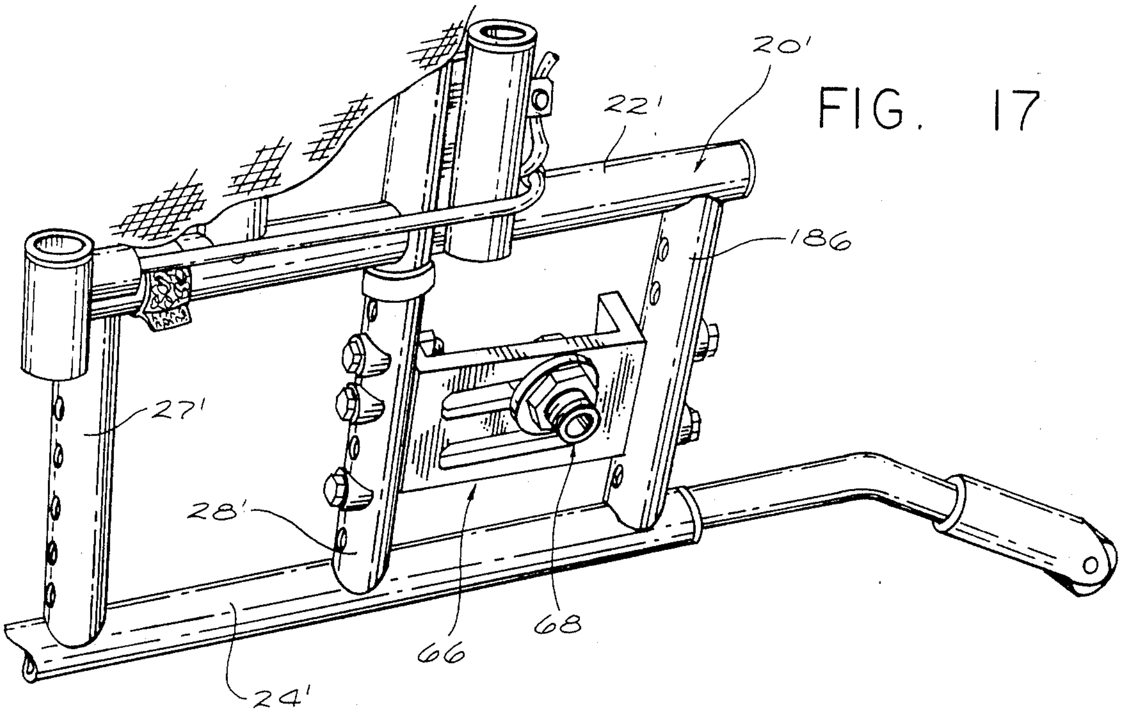

FOLDING WHEELCHAIR HAVING ADJUSTABLE WHEELS AND ARMRESTS

BACKGROUND OF THE INVENTION

This invention relates generally to improvements in the design and operation of wheelchairs. More particularly, this invention relates to an improved wheelchair construction of the type including relatively lightweight and foldable frame components which can be adjusted quickly and easily to conform with the specific requirements of an individual wheelchair user.

Wheelchairs in general are relatively well known in the art to include interconnected frame components having a seat structure mounted thereon, with the frame components being supported for rolling movement by relatively large rear wheels and comparatively smaller front wheels. In many such wheelchairs, various structural adjustment features are provided including, for example, seat position and/or height adjustment, armrest position, etc., to meet the needs of the individual using the wheelchair. In addition, some wheelchair designs incorporate means for adjusting the positions of the relatively large rear wheels, such as adjustment of the wheel axis position and/or adjustment of the wheel camber angle. In many wheelchair designs, the interconnected frame components are further adapted for folding movement between a compact, collapsed folded condition for facilitated shipment, storage or other transport, and an unfolded or deployed expanded condition for normal use.

The objects of the present invention include the provision of an improved wheelchair construction of a relatively lightweight and folding design, wherein the folding wheelchair includes a variety of adjustment features which can be performed quickly and easily and with little or no use of tools.

SUMMARY OF THE INVENTION

In accordance with the invention, an improved wheelchair of relatively lightweight foldable construction includes a plurality of relatively simple adjustment features to permit easy customized adaptation of the wheelchair to the specific needs of an individual wheelchair user. These adjustment features include, for example, improved means for selecting the axis position and/or camber angle of relatively large rear wheels for the wheelchair. In addition, the invention includes improved and easily adjusted armrest configurations as well as easily operated wheel lock units adapted for mounting in one of several convenient positions on the wheelchair frame.

In general terms, the improved folding wheelchair comprises a lightweight tubular frame including left and right frame sections interconnected by a pivoting, generally X-shaped cross brace assembly. The left and right frame sections respectively support a pair of relatively small front caster wheels and a significantly larger pair of rear wheels, wherein said wheels support the frame for the desired rolling movement. A sling seat is suspended between longitudinally extending upper seat rails on the left and right frame sections, and a flexible seatback extends between seatback posts projecting upwardly from the two frame sections. The X-shaped cross brace assembly is pivotally movable between a folded configuration with the left and right frame sections generally adjacent each other and an unfolded or deployed configuration with the frame sections spaced apart and the sling seat and seatback stretched relatively taut therebetween. Forward footrest units may also be provided on the frame sections, if desired.

In accordance with one aspect of the invention, each frame section includes an adjustably positioned camber plate having a wheel bushing adapted for quick release attachment to the associated rear wheel for the wheelchair. Each camber plate is adapted for mounting in one of several vertical positions between upright support posts on the associated frame section. The camber plate is mounted at the selected vertical position by bolts passed through one of a plurality of vertically spaced hole sets oriented at different camber angles, thereby selecting the specific angular position of the camber plate relative to said support posts. The wheel bushing is locked in turn along one of multiple longitudinally extending and vertically spaced camber plate slots, and said wheel bushing is adapted for lateral positional adjustment relative to the camber plate. Accordingly, the specific selection of the position and orientation of camber plate and wheel bushing effectively selects the rear wheel camber angle, the vertical and longitudinal position of the rear wheel axis, and the lateral spacing between the two rear wheels.

Adjustable armrest assemblies are mounted respectively on the left and right frame sections at opposite sides of the wheelchair seat. Each armrest assembly includes at least one upstanding arm post supported in a vertically adjustable manner within a support socket on the respective frame sections.

In one preferred form, the adjustable armrest assembly includes a single upstanding arm post disposed generally adjacent the seatback post and having an upper bracket pivoted to a forwardly projecting armrest. Limited lost motion is provided in the connection between the bracket and armrest to permit spring-biased longitudinal armrest movement in a rearward direction bringing a latch member on the armrest into locked engagement with a vertically adjustable latch keeper on the arm post. A forward pushing movement applied to the armrest is effective to disengage the latch member from the keeper and permit the armrest to be pivoted upwardly and rearwardly to an out-of-the-way position. Vertical adjustment of the latch keeper effectively selects the horizontal or tilted orientation of the armrest when the latch member and keeper are engaged.

In an alternative armrest assembly configuration, a generally horizontal armrest includes a pair of arm posts seated within a corresponding pair of support sockets on the respective frame section. These support sockets are associated in turn with a pivoting actuation lever coupled to a pair of lock pins spring-loaded to project into the support sockets and further into aligned openings formed in vertically spaced sets in the arm posts. The actuation lever is easily pivoted by the wheelchair user to retract the lock pins from the arm posts, thereby permitting easy armrest height adjustment.

In accordance with a further aspect of the invention, easily mounted fabric side panels are provided for rapid attachment by means of Velcro fasteners or the like to the upper seat rails and seatback posts. The side panels include a double ply construction and are appropriately seamed to define upwardly open storage pockets for ready access by the wheelchair user.

The wheel lock units include relatively simple clamps for quick and easy mounting onto the tubular frame sections in a selected position relative to the rear wheel chair wheels for selective wheel locking. The specific mounting position of the wheel lock units can be varied and/or adjusted as desired in accordance with the specific choice of the individual wheelchair user.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view depicting a lightweight folding wheelchair embodying the novel features of the invention;

FIG. 2 is an enlarged fragmented exploded perspective view depicting releasable mounting of a rear wheel for the wheelchair;

FIG. 3 is enlarged fragmented side elevation view of a portion of the wheelchair, taken generally on the line 3—3 of FIG. 2;

FIG. 4 is an enlarged fragmented horizontal sectional view taken generally on the line 4—4 of FIG. 3;

FIG. 5 is a perspective view illustrating a camber plate and associated wheel bushing for use with the invention;

FIG. 6 is a fragmented perspective view illustrating one preferred armrest assembly configuration for use with the invention, and showing the armrest assembly in a normal operating position;

FIG. 7 is a fragmented perspective view illustrating the armrest assembly of FIG. 6 in an optional out-of-the-way position;

FIG. 8 is an enlarged fragmented side elevation view depicting the armrest assembly of FIG. 6, with portions broken away to illustrate construction details thereof;

FIG. 9 is an enlarged fragmented horizontal sectional view taken generally on the line 9—9 of FIG. 8;

FIG. 12 is an enlarged fragmented side elevation view depicting a fabric side panel for use with the wheelchair of the present invention;

FIG. 13 is an enlarged fragmented perspective view illustrating mounting of the side panel onto the wheelchair;

FIG. 14 is an enlarged fragmented perspective view illustrating an accessible storage pocket formed within the side panel;

FIG. 15 is an enlarged fragmented perspective view illustrated a wheel lock unit in an unlocked position;

FIG. 16 is an enlarged fragmented and partially exploded perspective view illustrating the wheel lock unit of FIG. 15 in a locked condition; and FIG. 17 is an enlarged fragmented perspective view illustrating one alternative form of the wheelchair.

DETAILED DESCRIPTION OF THE PREFERRED EMBODIMENTS

Figure 10:
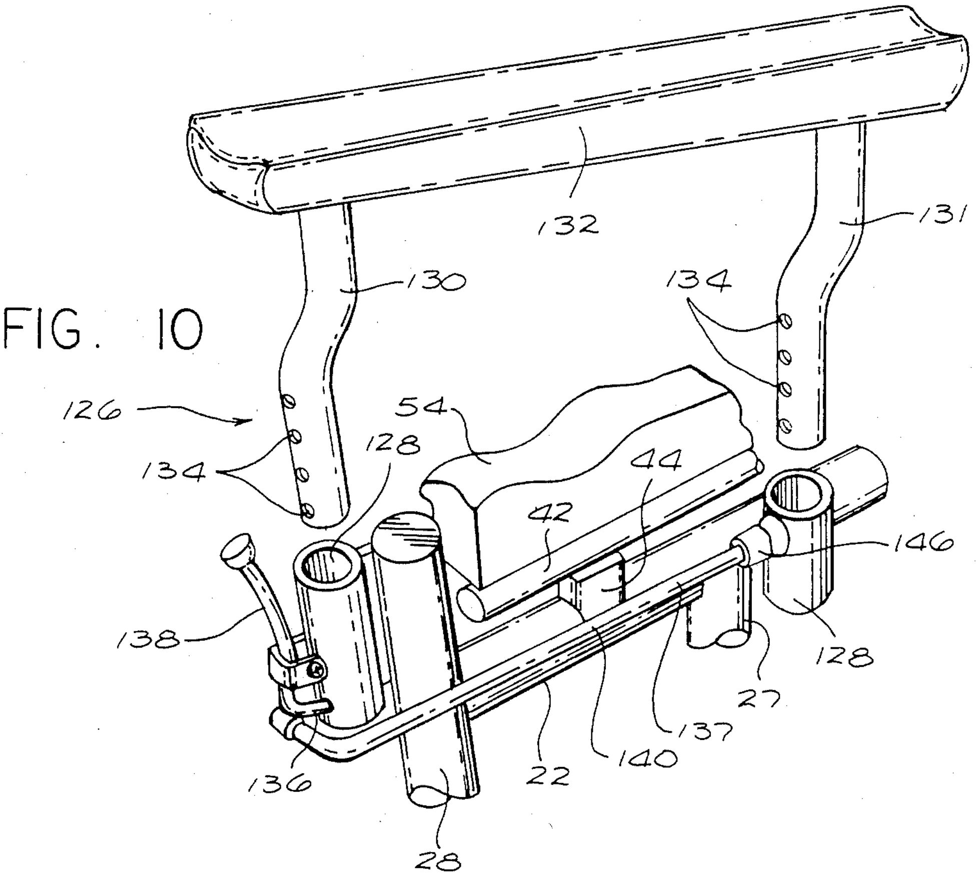
FIG. 10 is an enlarged fragmented exploded perspective view illustrating an alternative preferred armrest assembly for use with the invention.

As shown in the exemplary drawings, an improved folding wheelchair is referred to generally by the reference numeral 10. The wheelchair includes, as shown in FIG. 1, a relatively lightweight folding frame 12 having a seat structure 14 mounted thereon, wherein the frame 12 is supported for rolling movement in a conventional manner by relatively large rear wheels 16 and smaller front caster wheels 18.

The wheelchair 10 of the present invention incorporates several improved adjustment features designed to enhance the overall utility and ease of operation of the wheelchair. These adjustment features are compatible with constructing the wheelchair 10 from relatively lightweight components which can be moved quickly and easily between a standard unfolded or deployed position as viewed in FIG. 1 and a relatively compact folded or collapsed position for easy transport, shipment or storage. Importantly, the various adjustment features accommodate specialized customization of the wheelchair for meeting the needs of a specific wheelchair user.

As shown generally in FIGS. 1-3, the wheelchair frame 12 comprises a plurality of tubular frame components which advantageously can be formed from lightweight metal tubing such as aluminum or the like. The illustrative frame 12 comprises left and right sections 20 each including a pair of generally horizontal, longitudinally extending upper and lower frame members 22 and 24 which are rigidly interconnected by a front support post 26 and a spaced pair of rear support posts 27 and 28. These two frame sections 20 are pivotally interconnected by a cross brace assembly including a pair of generally X-shaped cross braces 30 and 32 which are pivotally interconnected in turn by a central pivot joint 34. As shown best in FIG. 3, the lower ends of these cross braces 30 and 32 are respectively connected in-line with the lower frame members 24 of the two frame sections be means of short brace members 30' and 32' and associated rotation-permitting bushings 36 of a suitable plastic or the like. Separate pivot links 38 and 40 are swingably interconnected between the upper frame members 22 and the upper cross braces 30 and 32 near the upper ends of those cross braces, with additional in-line rotation-permitting bushings 36 being provided along the upper frame members 22 to permit such pivot link rotation. The upper ends of the cross braces 30 and 32 project at least a short distance above the upper frame members 22 of the respective frame sections 20 and are secured to horizontal, longitudinally extending seat rails 42.

The cross braces 30 and 32 cooperate with the two pivot links 38 and 40 to accommodate folding movement of the wheelchair between folded and unfolded positions. More particularly, the cross braces 30 and 32 can be rotated about the central pivot joint 34 to displace the respective upper and lower ends of those cross braces generally toward each other. Such movement displaces the left and right frame sections 20 to generally adjacent, side-by-side positions thereby placing the wheelchair in a compact folded or collapsed condition. Alternately, the cross braces 30 and 32 can be pivoted in opposite directions to spread the left and right frame sections 20 to a deployed or unfolded condition for normal use, as viewed in FIG. 1. In the unfolded or deployed position, the seat rails 42 are spread apart with the frame sections and rest securely upon short support struts 44 projecting upwardly from the upper frame member 22 of each frame section at positions generally near the front and rear ends of the upper frame member 22. These support struts 44 advantageously provide for relatively uniform distribution of wheelchair loading throughout the entire frame 12, including the frame sections 22 and interconnecting cross brace assembly, as well as providing a relatively rigid chair construction when deployed notwithstanding folding capability.

The seat rails 42 of the wheelchair frame 12 provide a convenient mounting structure for rapid and stable support of a wheelchair seat, preferably in the form of a fabric sling seat 46 extending between the seat rails 42 (FIG. 1). This sling seat 46 cooperates with a similar flexible seatback 48 of a fabric material or the like mounted between a pair of upwardly projecting seat-back posts 50. The seatback posts 50 are conveniently received telescopically into upward extensions of the rear support posts 28 on the two frame sections 20, wherein these seatback posts may be adjusted in height by appropriate reception of lock bolts (not shown) through the components. In addition, the upper ends of the seatback posts terminate in upper horizontally turned handles 52 for use in pushing the wheelchair in a conventional manner. A foam-based seat cushion 54 is normally supported upon the sling seat 46 and cooperates with the seatback 48 to provide the seat structure 14 having a relatively high degree of overall comfort in use.

The front caster wheels 18 for the wheelchair 10 are generally conventional in design to include relatively small diameter wheels mounted on wheel forks 56 which are supported in turn within associated swivel sockets 58 on the lower frame members 24 of the left and right frame sections 20. In addition, the wheelchair may include conventional front footrest units 60 mounted, for example, on the front support posts 26 on the two frame sections. These footrest units 60 can be adapted for swing-out movement to out-of-the-way positions as described, for example, in U.S. Pat. No. 4,176,879, with appropriate latch structures 61 being provided for releasably locking the footrest units in the normal operational positions as shown in FIG. 1. In addition, if desired, these footrest units 60 may include protective bumper rollers 62 as described, for example, in U.S. Pat. No. 4,592,570. Moreover, standard antitip bars 64 (FIG. 2) can be installed within the rear ends of the lower frame section members 24 to prevent inadvertant rear tipover of the wheelchair 10.

In accordance with one primary feature of the improved wheelchair 10 of the present invention, means are provided for significant adjustment in the specific mounting positions of the relatively large rear wheels 16. More particularly, as shown in detail in FIGS. 2–5, each of the left and right frame sections 20 incorporates a relatively simple camber plate 66 mounted in one of a plurality of different positions or orientations between the rear support posts 27 and 28 of the associated frame section. The camber plate 66 is mounted in a manner selecting the vertical position of the rotational wheel axis relative to the wheelchair frame 12, and also to select the specific wheel camber angle relative to the frame. Each camber plate 66 supports a relatively simple wheel bushing 68 which can be adjusted longitudinally in the fore-aft direction and vertically with respect to the camber plate to select the specific wheel axis position. In addition, the wheel bushing 68 can be adjusted for altering the lateral spacing between the two large rear wheels 16, thereby achieving further wheel positional adjustment as required by the individual wheelchair user.

The camber plate 66 mounted on each of the two frame sections comprises a generally U-shaped structure having opposed, relatively short connector legs 70 interconnected by a mounting plate 72 sized to span the fore-aft spacing between the rear support posts 27 and 28. Bolts 74 or the like are provided to pass through selected vertically spaced openings 76 in the posts 27 and 28 to permit vertical height selection of the camber plate position relative to the associated frame section 20. More importantly, two of these bolts 74 are passed through each of the support posts 27 and 28 for fastening into one of a plurality of vertically spaced sets of threaded bores 78 in the adjacent camber plate connecting leg 70 to select the camber angle of the associated large rear wheel 16, when said wheel is mounted onto the wheel bushing 68 as will be described.

More specifically, with reference to FIGS. 4 and 5, the illustrative drawings show three sets of vertically spaced bores 78 in the camber plate connector legs 70 wherein these sets of bores are oriented at common vertical spacings but at different angular relationships for camber angle selection. FIG. 5 illustrates the outboard set of threaded bores 78, referred by the letter A, in vertically aligned relation, namely, a camber angle of zero degrees. An inboard set of the threaded bores 78 is referred to by the letter B and is oriented at a camber angle of about six degrees, whereas an intermediate set of the bores identified by the letter C is oriented at an intermediate camber angle of about three degrees. Appropriate selection of the pair of bores for receiving the mounting bolts 74 for each connector leg 70 correspondingly selects the specific camber angle for wheel mounting.

The associated wheel bushing 68 comprises an externally threaded sleeve 80 sized to project transversely or laterally through one of a pair of longitudinally elongated, vertically spaced horizontal slots 82 formed in the mounting plate 72 of the camber plate 66. Inboard and outboard lock nuts 84 with accompanying washers 85 are threaded onto the sleeve 80 on opposite sides of the mounting plate 72 and thus may be tightened into engagement with the mounting plate to secure the sleeve 80 in position. Accordingly, the wheel bushing 68 can be vertically adjusted relative to the mounting plate 72 by selection of the appropriate slot 82 and then longitudinally adjusted within that slot before tightening of the lock nuts 84. This positional adjustment capability advantageously permits vertical and longitudinal wheel axis adjustment to select the specific wheelchair operating characteristics including, for example, the precise location of the wheelchair center of gravity during use.

The threaded sleeve 80 of each wheel bushing 68 defines a laterally open bore for easy reception of a lock pin 86 projecting in an inboard direction from the central hub 88 of the associated wheelchair wheel 16, as viewed best in FIG. 2. In the preferred form, this lock pin 86 is of a known quick-release type as described, for example, in U.S. Pat. No. 4,477,098 to include a lock ball 90 or the like engagable in a secure locking manner with the sleeve 80 to hold the wheelchair wheel in place. The lock ball 90 may be retracted from engagement with the sleeve 80 by appropriate depression of an outer release button 92 on the wheel hub 88 for wheel removal, when desired. Importantly, however, the camber angle adjustment of the camber plate 66 correspondingly selects the specific camber angle of the wheel 16 when mounted into the associated wheel bushing 68. Moreover, the specific axial position of the threaded sleeve 80 within the associated lock nuts 84 can be adjusted to correspondingly increase or decrease the track width spacing between the two rear wheels 16, again in accordance with the specific operating requirements of the individual wheelchair user.

In accordance with further aspects of the improved wheelchair 10, an improved armrest assembly 94 is mounted onto the left and right frame sections at the opposite sides of the wheelchair seat structure 14. This armrest assembly 94 is shown in one preferred form in FIGS. 1,2 and 6–9 to include an upright arm post 96 locked into an arm socket 98 at a vertically selected position by a bolt 100 or the like, wherein this arm socket is conveniently mounted by welding or other suitable connection means to the upright seatback post 50 near the lower end thereof. The upper end of the arm post 96 is connected to an upwardly and rearwardly angled, generally U-shaped bracket 102 having its free ends pivoted to an armrest 104 at a position near the rear end of the armrest. Importantly, this pivoting connection is achieved with at least some lost motion, for example, by means of a pivot pin 106 extending transversely through a longitudinally elongated slot 108 in the armrest 104 (FIG. 8), with a compression spring 110 reacting between the pivot pin 106 and a plug 112 at the rear end of the armrest for normally urging the armrest 104 in a rearward direction relative to the bracket 102, as illustrated by arrow 114 in FIG. 8. From the bracket 102, the armrest 104 normally projects in a general forward direction at the side of the wheelchair and includes suitable upholstery 116 or associated padding for enhanced user comfort. In this normal, generally horizontal position, the armrest 104 rests upon a vertically adjustable screw 118 mounted within a small cylinder 120 on the arm post 96 and vertically adjustable therein to select the specific horizontal or angular attitude of the armrest 104 during normal use.

As shown further in FIGS. 8 and 9, in the normal operating position, a rearwardly slotted latch member 122 on the underside of the armrest 94 normally receives the shank of the height adjustment screw 118 at a position beneath the screw head 118', whereby the screw head 118' defines a latch keeper preventing upward swinging movement of the armrest 104 about the axis of the pivot pin 106. However, the armrest 104 can be pushed forwardly in the direction of arrow 124 (FIG. 8) within the limits of the lost motion slot 108 and against the compression spring 110 to release the latch member 122 from the screw head of the latch keeper and permit upward swinging motion of the armrest to an out-of-the-way position, viewed in FIG. 7. Importantly, this manipulation of the armrest 104 may be accomplished quickly and easily by persons with limited manual dexterity, such as quadriplegics, merely by pushing upon the rear end of the armrest 104. Moreover, return swinging movement of the armrest to the normal, horizontal position is accompanied by self latching engagement between the screw head 118 and the latch member 122, as a result of the forward sloping surface of the screw head 118'.

Figure 11:
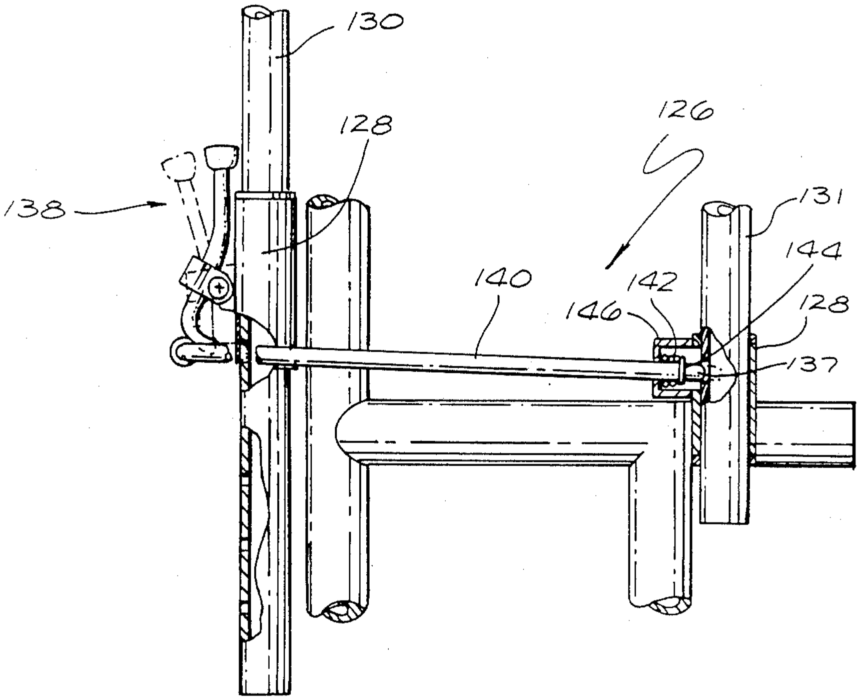
FIG. 11 is a fragmented side elevation view depicting the construction and operation of the alternative armrest assembly of FIG. 10.

An alternative preferred armrest configuration is shown in FIGS. 10 and 11, wherein this alternative armrest assembly 126 is also adapted for positional adjustment by a person having a minimum dexterity capability. More specifically, in this embodiment, the armrest assembly 126 comprises a pair of tubular arm sockets 128 mounted suitably on the left and right frame sections 20 to define upwardly open passages for receiving downwardly extending arm posts 130 and 131, respectively, have upper ends mounted to a generally horizontal armrest 132. These arm posts 130 and 131 include vertically spaced sets of ports 134 for locking reception of a pair of retractable lock pins 136 and 137. The lock pin 136 is defined by a forwardly turned end of an actuation lever 138 pivotly mounted onto the rear socket 128, whereas the second lock pin 137 is defined by the forwardly projecting end of an elongated pin member 140 secured to the lever 138. A spring 142 conveniently reacts between a flange 144 on the pin 137 and a shoulder within a cylindrical boss 146 for urging both pins 136 and 137 normally into locking engagement with the arm post ports 134.

The armrest assembly 126 is adjusted quickly and easily to select the vertical position of the armrest 132 by a simple forward pivoting motion of the upper end of the actuation lever 138, as shown best in FIG. 11. Such forward pivoting motion is accompanied by retraction of the lock pins 136 and 137, and such forward motion is conveniently accomplished easily by a person having limited dexterity by simple pushing on the upper end of the lever 138. With the lever held in a forwardly pivoted position, as shown in FIG. 11, the armrest 132 can be vertically repositioned to the desired location, whereupon the lever may be released for spring-biased locking engagement with the armrest ports 134.

As shown in FIGS. 1 and 12–14, fabric side panels 150 are advantageously provided at the sides of the seat structure 14. These side panels 150 may be formed from the same flexible fabric material as the sling seat 46 and the seatback 48. The side panels 150 are mounted quickly and easily by means of wraparound straps 152 having suitable Velco type closure members for secure engagement with the frame members 22 at the sides of the seat structure 14. From the straps 152, the side panels extend upwardly with a generally triangular configuration terminating with a rear marginal flap 154 having a suitable Velcro type closure member 155 for releasable engagement with a mating closure member 156 on the rear side of the seatback 48, as viewed in FIGS. 12 and 13. Accordingly, the side panels 150 can be mounted and/or removed quickly and easily without the use of tools or other special mounting devices.

As shown in FIGS. 12 and 14, the side panels 150 are beneficially formed with a double ply construction and appropriately seamed as at 158 to define an upwardly open pocket 160 within which small articles can be stored in a conveniently accessible location. Velcro type closure members 161 and 162 are provided lining the upper margins of the pocket 160 to permit easy closure thereof.

As shown in FIGS. 15 and 16, a relatively simple wheel lock unit 170 can be mounted quickly and easily onto each of the frame sections 20 for releasable locking engagement with the adjacent rear wheel 16. Importantly, in the improved wheelchair 10, this wheel lock unit 170 can be mounted on the upper frame member 22 or the lower frame member 24 of the frame section 20, as desired by the individual wheelchair user. In either position, the wheel lock unit 170 is easily operated in a conventional manner for engaging and locking with the wheel tire.

More particularly, the illustrative unit 170 comprises a pair of clamp sections 172 and 174 for secure clamp mounting by means of screws 175 or the like onto the adjacent portion of the frame section 20, with said clamp sections 172 and 174 being shown mounted onto the upper frame member 22. The clamp section 174 carries a base strip 176 upon which is mounted a centrally pivoted actuation crank 178 and a lock link 180 having an outwardly extending lock bar 182. An intermediate connector link 186 is pivotally connected between the crank 178 and the lock link 180 for appropriate over-center motion displacing the lock bar 182 between a first position spaced from the wheel tire (FIG. 15) and a second position seated against and locked with the wheel tire (FIG. 16). In the second position, of course, the lock bar 182 prevents tire rotation, thereby preventing rolling movement of the wheelchair.

In a further alternative form of the invention, as viewed in FIG. 17, the left and right frame sections can be modified to provide additional wheel mount position adjustment capability. In particular, modified upper and lower frame member 22′ and 24′ for a modified frame section 20′ can be provided to extend rearwardly beyond associated rear support posts 27′ and 28′ as described with respect to FIGS. 1-5, with a third auxiliary support post 186 interconnecting the rearmost ends of these frame members. The auxiliary support post 186 cooperates with the other two support posts 27′ and 28′ to provide a secondary and rearwardly spaced position for mounting of the camber plate 66 between the auxiliary post 186 and the rear post 28′. Accordingly, significant fore-aft adjustment capability in wheel mount position can be obtained by mounting the camber plate between the posts 27′ and 28′, or between the posts 28′ and 186 to correspondingly achieve a significant variation in wheelchair center of gravity during use. The rearward mounting position of the camber plate 66 is especially desirable for some leg amputee users of the wheelchair, wherein such persons otherwise have a body center of gravity at a relative rearward position. This rearward body center of gravity can be accommodated or offset by the rearward mounting of the camber plate 66, as viewed in FIG. 17.

Accordingly, the improved folding wheelchair of the present invention provides wide range adjustment capability to permit customization of the wheelchair to suit the needs of the individual wheelchair user. The various adjustments can be performed quickly and easily and without the use of specialized tools.

A variety of further modifications and improvements to the improved wheelchair 10 described herein will be apparent to those skilled in the art. Accordingly, no limitation on the invention is intended by way of the description and accompanying drawings, except as set forth in the appended claims.

What is claimed is:

1. A wheelchair, comprising:

a wheelchair frame;

a seat structure supported by said wheelchair frame; and wheel means mounted on said frame for supporting said wheelchair for rolling movement, said wheel means including at least two relatively large rear wheels and means for mounting said rear wheels on opposite sides of said wheelchair frame;

said means for mounting said rear wheels including first and second pairs of generally upright support posts on said wheelchair frame at opposite sides thereof, a pair of camber plates for mounting on the opposite sides of said wheelchair frame in positions respectively between said first and second pairs of generally upright support posts, each of said camber plates having at least three sets of openings formed in a surface extending perpendicularly to the planes of said plates and said wheels at common vertical spacings and at respectively different camber angles relative to a vertical longitudinally extending plane, and fastener means for reception into a selected one of said sets of openings for connecting said camber plate to said adjacent pair of support posts.

2. The wheelchair of claim 1 wherein said at least three sets of openings in each of said camber plates are respectively oriented at camber angles of about zero, three and six degrees relative to a vertical plane.

3. The wheelchair of claim 1 wherein said mounting means further includes a third support post extending generally vertically at each side of said wheelchair frame, said pair of support posts and said third support post at each side of said wheelchair frame being oriented generally in a common plane, said pair of support posts and said third support post cooperating to define a pair of longitudinally spaced interpost regions for selective mounting of said camber plate into one of said regions by use of said fastener means, whereby the selected one of said regions to mount said camber plate results in substantial variation in the position of the center of gravity of the wheelchair.

4. The wheelchair of claim 1 wherein said wheelchair frame further includes a pair of armrest assemblies at opposite sides thereof, each of said armrest assemblies including a generally horizontally oriented armrest, means for supporting said armrest generally at a rear end thereof for swinging movement between a normal generally horizontal position and an out-of-the-way position projecting upwardly and rearwardly from the wheelchair, and means for releasably locking said armrest in said normal position.

5. The wheelchair of claim 4 wherein said supporting means further includes means for adjusting the specific angular attitude of said armrest relative to said armrest supporting means when said armrest is in said normal position.

6. The wheelchair of claim 1 wherein said seat structure includes a seat and a seatback mounted on said wheelchair frame, and further including at least one side panel mounted on one side of said wheelchair frame, said at least one panel being formed from a flexible sheet material defining an accessible pocket.

7. The wheelchair of claim 6 wherein said side panel comprises a flexible double ply fabric material sewn to define said pocket and including means for selectively closing said pocket.

8. The wheelchair of claim 1 wherein said wheelchair frame includes a pair of side frame sections each including upper and lower generally horizontal frame members, and further including a pair of wheel lock units respectively mounted on said pair of side frame sections, each of said wheel lock units being selectively and interchangeably mounted upon one of said upper and lower frame members of the associated frame section.

9. The wheelchair of claim 8 wherein said wheelchair frame further includes a cross brace assembly interconnecting said side frame sections, said cross brace assembly being movable with said side frame sections between a folded position with said side frame sections disposed generally side-by-side, and an unfolded position with said side frame sections spread apart for normal use of the wheelchair.

10. A wheelchair, comprising:

a wheelchair frame;

a seat structure supported by said wheelchair frame; and wheel means mounted on said frame for supporting said wheelchair for rolling movement, said wheel means including at least two relatively large rear wheels and means for mounting said rear wheels on opposite sides of said wheelchair frame;

said means for mounting said rear wheels including first and second pairs of generally upright support posts on said wheelchair frame at opposite sides thereof, a pair of camber plates for mounting on the opposite sides of said wheelchair frame in positions respectively between said first and second pairs of generally upright support posts, each of said camber plates having a plurality of sets of openings formed therein at common vertical spacings and at respectively different camber angles relative to a vertical longitudinally extending plane, and fastener means for reception into a selected one of said sets of openings for connecting said camber plate to said adjustment pair of support posts;

each of said camber plates having a generally U-shaped configuration to include a pair of relatively short connector legs interconnected by a mounting plate, said connector legs having said sets of openings formed therein for connection by said fastener means to said support posts, said mounting plate supporting a wheel bushing for connection to the associated one of said large rear wheels.

11. The wheelchair of claim 10 wherein said fastener means for each of said camber plates comprises a pair of bolt members associated with each of said camber plate connector legs for passage through a respective pair of vertically holes formed in the associated one of said support posts for further fastening engagement with said connector leg adjacent thereto.

12. The wheelchair of claim 11 wherein said support posts include a plurality of said holes formed therein to permit vertical adjustment in the position of said camber plate relative to said support posts.

13. The wheelchair of claim 11 wherein said camber plate includes means for vertical adjustment in the position of said wheel bushing relative to said support posts when said camber plate is mounted upon said support posts.

14. The wheelchair of claim 11 wherein said camber plate includes means for longitudinal adjustment in the position of said wheel bushing in the fore-aft direction relative to said support posts and said wheelchair frame when said camber plate is mounted upon said support posts.

15. The wheelchair of claim 11 wherein said wheel bushing on each of said camber plates includes means for adjusting the lateral spacing between said rear wheels when said rear wheels are mounted on said wheelchair frame.

16. A wheelchair, comprising:

a wheelchair frame;

a seat structure supported on said wheelchair frame;

at least two wheels for mounting onto said wheelchair frame at opposite sides thereof;

a pair of camber plates for use in respectively mounting said wheels to said wheelchair frame, each of said camber plates including at least three pairs of openings formed in a surface extending perpendicularly to the planes of said plates and said wheels at a common vertical spacing but at a different camber angle relative to a vertical longitudinally extending plane;

fastener means including a pair of bolt members associated with each of said camber plates for selective reception into a selected one of said pairs of camber plate openings to connect said camber plate to said wheelchair frame at a selected camber angle; and means carried by said camber plates for connection to said pair of wheels.

17. The wheelchair of claim 16 wherein said wheelchair frame includes at each side thereof first and second generally vertically oriented support posts spaced apart in a fore-aft direction relative to said wheelchair frame, said camber plates each including a mounting plate sized and shaped to fit between said first and second support posts at the associated sides of said wheelchair frame and including matched sets of said pairs of openings at the opposite ends of said camber plate, said fastener means including a pair of bolt members associated with each of said first and second support posts for connection respectively to the opposite ends of said camber plate.

18. The wheelchair of claim 16 wherein said pair of camber plates and said means carried by said camber plates for connection to said pair of wheels cooperately define means for adjsuting the vertical and longitudinal positions of the rotational axis of said wheel relative to said wheelchair frame and further for adjusting the lateral spacing of said wheels when connected to said camber plates mounted on said frame.

19. The wheelchair of claim 16 wherein said wheelchair frame further includes at each side thereof a third generally vertically oriented support post disposed generally coplanar with the adjacent first and second support posts, said first and second supports posts defining a first region for mounting of the associated camber plate therebetween, and said second and third support posts defining a second region for mounting of said associated camber plate therebetween, whereby said associated camber plate can be mounted within a selected one of said first and second regions to vary the position of the center of gravity of the wheelchair.

20. A wheelchair, comprising:

a wheelchair frame;

a seat structure supported by said frame;

wheel means supporting said frame for rolling movement; and a pair of armrests mounted on said wheelchair at opposite sides of said seat structure, each of said armrests including a generally vertically oriented arm post projecting upwardly from said frame, an armrest bracket generally at the upper end of said arm post, an armrest pivotally connected to said bracket generally at one end of said armrest, said armrest being pivotally connected with lost motion to said bracket and extending therefrom generally forwardly in a normal position, said armrest being swingable relative to said bracket to an out-of-the-way position extending generally upwardly and rearwardly from said frame, a latch member on said armrest and a latch keeper on said arm post, said latch member and keeper being engagable with said armrest in said normal position to lock with and prevent swinging movement of said armrest, said armrest being movable forwardly relative to said bracket within the limits of the lost motion provided by the pivotal connection to disengage said latch member and keeper to permit swinging movement of said armrest to said out-of-the-way position;

said latch keeper comprising a screw threadably mounted on said arm post and having a screw head adjustable vertically relative to said arm post upon rotation of said screw relative to said arm post.

21. The wheelchair of claim 20 wherein said latch member and said screw cooperate for self latching engagement of said latch member and screw upon movement of said armrest from said out-of-the-way position to said normal position.

* * * * *